United States Patent
Ha et al.

(10) Patent No.: US 12,024,056 B2
(45) Date of Patent: Jul. 2, 2024

(54) METHOD AND APPARATUS FOR MANAGING SHARED PERSONAL MOBILITY VEHICLE

(71) Applicants: HYUNDAI MOTOR COMPANY, Seoul (KR); KIA CORPORATION, Seoul (KR); KOOKMIN UNIVERSITY INDUSTRY ACADEMY COOPERATION FOUNDATION, Seoul (KR)

(72) Inventors: Jae Jun Ha, Hwaseong-si (KR); Gu Min Jeong, Seoul (KR); Hyun Jung Oh, Seoul (KR); Seung Hyeon Lee, Seoul (KR)

(73) Assignees: HYUNDAI MOTOR COMPANY, Seoul (KR); KIA CORPORATION, Seoul (KR); KOOKMIN UNIVERSITY INDUSTRY ACADEMY CO-OP FDN, Seoul (KR)

( * ) Notice: Subject to any disclaimer, the term of this patent is extended or adjusted under 35 U.S.C. 154(b) by 332 days.

(21) Appl. No.: 17/404,028

(22) Filed: Aug. 17, 2021

(65) Prior Publication Data
US 2022/0055501 A1 Feb. 24, 2022

(30) Foreign Application Priority Data

Aug. 21, 2020 (KR) .................. 10-2020-0105656
Apr. 23, 2021 (KR) .................. 10-2021-0052737

(51) Int. Cl.
*H02J 7/00* (2006.01)
*B60L 50/50* (2019.01)
*B60L 58/13* (2019.01)
*H04W 4/40* (2018.01)

(52) U.S. Cl.
CPC ............... *B60L 58/13* (2019.02); *B60L 50/50* (2019.02); *H04W 4/40* (2018.02); *B60L 2200/24* (2013.01)

(58) Field of Classification Search
None
See application file for complete search history.

(56) References Cited

U.S. PATENT DOCUMENTS

2014/0104739 A1* 4/2014 Nakamoto ........... G01R 31/374
361/160
2016/0189324 A1* 6/2016 Eramian ................ H04W 4/40
705/13

* cited by examiner

*Primary Examiner* — Arun C Williams
(74) *Attorney, Agent, or Firm* — MCDONNELL BOEHNEN HULBERT & BERGHOFF LLP

(57) ABSTRACT

An apparatus for managing a shared personal mobility (PM) vehicle comprises a battery unit configured to supply power, a communication unit configured to communicate with a server and road side units, and a control unit configured to determine whether to manage a PM vehicle based on at least one of a position, a position change, and a battery charge amount of the PM vehicle and transmit a management notification message to the server.

12 Claims, 5 Drawing Sheets

METHOD AND APPARATUS FOR MANAGING SHARED PERSONAL MOBILITY VEHICLE

CROSS REFERENCE TO RELATED APPLICATIONS

This application is based on, and claims priority from, Korean Patent Application Number 10-2020-0105656 filed on Aug. 21, 2020, and Korean Patent Application Number 10-2021-0052737 filed on Apr. 23, 2021, the disclosure of each of which is incorporated by reference herein in its entirety.

TECHNICAL FIELD

Embodiments of the present disclosure relate to an apparatus and method for managing a shared personal mobility (PM) vehicle, and more particularly, to an apparatus and method for managing a shared PM vehicle on the basis of a position, a position change, and a battery charge amount of the PM vehicle.

BACKGROUND

The statements described in this section merely provide background information for the present disclosure and does not constitute the related art.

As a moving means or a transportation means, the proportion of vehicles is decreasing, and the proportion of Personal Mobility vehicles (PM vehicles) is gradually increasing. Here, the PM vehicle is a moving object and means a moving means including an electric kickboard, a bike, a smart car, a vehicle, a Purpose-Built Vehicle (PBV), an air vehicle, and the like.

Since personal mobility vehicles (PM vehicles) may travel short distances or on narrow roads, the PM vehicles are superior to vehicles in terms of mobility and accessibility. In order to actively promote the use of PM vehicles, roads exclusively for the PM vehicles are being built in the city center at home and abroad.

Meanwhile, as the number of users using PM vehicles increases and types of PM vehicles become more diverse, the number of users using PM vehicle sharing services who rent and use the PM vehicles for a certain period is increasing. When users use the PM vehicle sharing services, even when the users do not own the PM vehicles, the users can use the PM vehicles when and where the users need the PM vehicles, and as a result, can use the PM vehicles conveniently.

The PM vehicle sharing service is divided into a method of providing a PM vehicle at a designated location and a method of providing a PM vehicle at an arbitrary location.

First, in the case of the service in which the PM vehicles are provided at designated locations, users may rent or return the PM vehicles at the designated locations. However, this method has a problem in that users lower accessibility to the PM vehicle sharing services.

On the other hand, in the service in which the PM vehicles are provided at arbitrary locations other than the designated locations, users may rent or return the PM vehicles at arbitrary locations such as a roadside or an alley. This is called a dock-less PM vehicle sharing service. In the dock-less PM vehicle sharing service, the user may return the shared PM vehicle at any place, but there is a problem in that the PM vehicle becomes an obstacle to walking and the dock-less PM vehicle sharing service is difficult to maintain and manage.

Specifically, when the PM vehicle is unattended for a long period of time in the dock-less PM vehicle sharing service, other users cannot use the PM vehicle. In addition, there is a problem in that it is difficult to confirm whether the state of the PM vehicle is actually unattended. Even when it is confirmed whether the PM vehicle is unattended, a battery thereof should be sufficiently charged to notify a server of the state of the PM vehicle.

Therefore, it is necessary to research and develop clear and specific criteria for determining whether the shared PM vehicle is a management target in consideration of the battery charge amount.

Meanwhile, a global navigation satellite system (GNSS) based on satellite signals is used to determine positions of vehicles. An example of the GNSS may include a global positioning system (GPS). Vehicle to everything (V2X) standard technologies applied to intelligent transportation systems also estimate positions of vehicles based on the GPS.

However, in urban areas with many high-rise buildings, GPS signals are diffusely reflected by high-rise buildings. The GPS diffused reflection may interrupt the GPS signals to be transmitted to a destination at a shortest distance, thereby reducing the accuracy of positioning. In addition, since it is difficult to receive satellite signals in a GPS dead zone such as an indoor parking lot, it is more difficult to determine the positions of the vehicles. This makes it difficult to determine whether the PM vehicle is in an unattended state or to manage power of the PM vehicle.

Therefore, when managing the shared PM vehicle, it is necessary to accurately determine the position of the PM vehicle.

SUMMARY

According to at least one embodiment, the present disclosure provides an apparatus for managing a shared personal mobility vehicle (PM vehicle), comprising a battery unit configured to supply power, a communication unit configured to communicate with a server and road side units, and a control unit configured to determine whether to manage a PM vehicle based on at least one of a position, a position change, and a battery charge amount of the PM vehicle and transmit a management notification message to the server.

According to another embodiment, the present disclosure provides a method of managing a shared personal mobility vehicle (PM vehicle) implemented by a computer, the method comprising measuring a battery charge amount of a PM vehicle; estimating a position of the PM vehicle; determining whether to manage the PM vehicle based on at least one of the position, a position change, and the battery charge amount of the PM vehicle; and transmitting a management notification message to a server.

DETAILED DESCRIPTION

Figure 1:
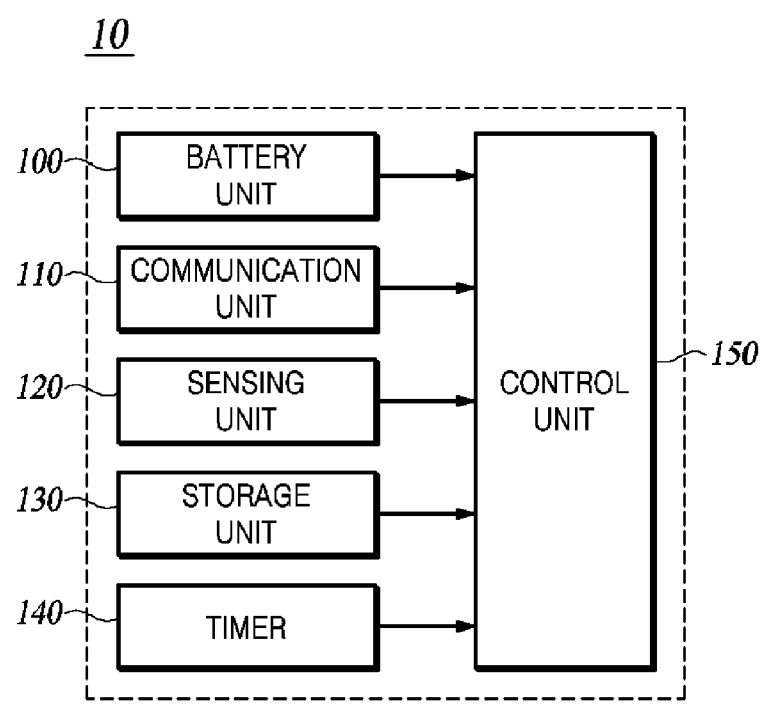
FIG. 1 is a configuration diagram of an apparatus for managing a shared personal mobility vehicle (PM vehicle) according to an embodiment of the present disclosure.

Embodiments of the present disclosure provide an apparatus and method for managing a shared personal mobility vehicle (PM vehicle) capable of improving accessibility and convenience for users by finding and managing PM vehicles that are positioned at locations that are difficult for users to access or that are not used for a long period of time in a PM vehicle sharing service.

Other embodiments of the present disclosure provide an apparatus and method for managing a shared PM vehicle capable of managing PM vehicles before the PM vehicles are completely discharged by transmitting management notification to a server and taking into account a battery charge amount when the PM vehicles are in an inaccessible area or left in a PM vehicle sharing service.

Other embodiments of the present disclosure provide an apparatus and method for managing a shared PM vehicle capable of accurately estimating positions of PM vehicles through communication with an intelligent transport system (ITS) in estimating the positions of the PM vehicles.

Hereinafter, some embodiments of the present disclosure will be described with reference to the exemplary drawings. It is to be noted that in giving reference numerals to components of the accompanying drawings, the same components will be denoted by the same reference numerals even when the components are illustrated in different drawings. In describing the present disclosure, when it is determined that a detailed description of related known functions or configurations may obscure the subject matter of the present disclosure, the detailed description thereof will be omitted.

In addition, in describing the components of the present disclosure, terms such as first, second, A, B, (a), (b), etc. may be used. These terms are used only in order to distinguish any component from other components, and features, sequences, or the like, of corresponding components are not limited by these terms. Throughout the present specification, unless explicitly described to the contrary, "including" and "comprising" any components will be understood to imply the inclusion of other elements rather than the exclusion of any other elements. A term such as "part," "module," or the like described in the specification means a unit of processing at least one function or operation and may be implemented as hardware or software or a combination of hardware and software.

Hereinafter, a Personal Mobility Vehicle (hereinafter referred to as PM vehicle) means a moving object. Examples of the PM vehicle include a micro mobility vehicle, an electric bicycle, an electric kickboard, an electric scooter, an electric wheelchair, an electric bike, a Segway®, a 2-wheel drive vehicle, a smart car, a shuttle, a personal moving means, a personal flying means, a smart mobility vehicle, a shared mobility vehicle, first mile vehicle, last mile vehicle, a Purpose Built Vehicle (PBV), a personal air vehicle (PAV), a vehicle, an electric vehicle, or the like.

In addition, an intelligent transport system (ITS) includes road side units (RSUs) or mobile communication base stations, and all of the RSUs or the mobile communication base stations perform broadcasting but may support a communication method such as unicast or multicast if necessary. Hereinafter, the RSUs (RSUs) are described on the basis of performing vehicle to everything (V2X) communication with a personal mobility vehicle (PM vehicle), but the present disclosure is not limited thereto, and LTE-V2X, C-V2X, 5G-V2X, wireless access in vehicular environment (WAVE), dedicated short range communication (DSRC), or the like may be used. That is, communication protocols used in the ITS may be used.

An apparatus for managing a shared PM vehicle is preferably implemented as a server located outside the PM vehicle but is not limited thereto and may be implemented as a device, a user terminal, or the like located inside the PM vehicle. The apparatus for managing a shared PM vehicle may store in advance at least one of a virtual map, identification information of the RSU, position coordinates corresponding to the identification information of the RSU, identification information of the PM vehicle, and subscriber information of a user. Here, the position coordinates mean a latitude and a longitude or mean two-dimensional or three-dimensional coordinates based on a specific point. Hereinafter, it will be described that the apparatus for managing a shared PM vehicle is mounted on the PM vehicle.

Hereinafter, the apparatus for managing a shared PM vehicle may include one or more components that enable communication with an external device and may include at least one of a short-range communication module and a wireless communication module.

The short-range communication module may include various short-range communication modules that transmit/receive a signal using a wireless communication network at a short range such as a Bluetooth module, an infrared communication module, a Radio Frequency Identification (RFID) communication module, an ultra-wide band (UWB), a Wireless Local Access Network (WLAN) communication module, a Near Field Communication (NFC) communication module, and a ZigBee communication module.

The wireless communication module may include a wireless communication module supporting various wireless communication methods such as V2X, cellular-V2X (C-V2X), wireless access in vehicle environment (WAVE), dedicated short range communication (DSRC), Wi-Fi module, long term evolution (LTE), and new radio (NR).

FIG. 1 is a configuration diagram of an apparatus for managing a shared PM vehicle according to an embodiment of the present disclosure.

Referring to FIG. 1, the apparatus 10 for managing a shared PM vehicle includes a battery unit 100, a communication unit 110, a sensing unit 120, a storage unit 130, a timer 140, and a control unit 150.

The battery unit 100 is a component that supplies power. Specifically, the battery unit 100 supplies power to the communication unit 110, the sensing unit 120, the storage unit 130, the timer 140, and the control unit 150.

The battery unit 100 includes a first battery that supplies power to the apparatus 10 for managing a shared PM vehicle and a second battery that supplies power to the PM vehicle. However, the first battery and the second battery may be implemented as one battery. Hereinafter, the battery charge amount of the PM vehicle means a charge amount of the battery unit 100.

In a PM vehicle power non-saving mode, the battery unit 100 supplies power to all of the communication unit 110, the sensing unit 120, the storage unit 130, the timer 140, and the control unit 150.

On the other hand, in the PM vehicle power saving mode, the battery unit 100 supplies power to the communication unit 110 and does not supply power to the sensing unit 120, the storage unit 130, the timer 140, and the control unit 150. That is, in the PM vehicle power saving mode, the battery unit 100 supplies power only to the communication unit 110.

The communication unit 110 is a component that performs wired/wireless communication with an ITS. Here, the ITS includes a server and RSUs. That is, the communication unit 110 may communicate with the server and the RSUs.

The communication unit 110 may estimate a position of a PM vehicle through communication with RSUs. In particular, the position of the PM vehicle may be accurately estimated using a reference RSU and an auxiliary RSU. This will be described in detail with reference to FIGS. 4A and 4B.

When it is determined that the PM vehicle is a management target according to a command of the control unit 150, the communication unit 110 transmits a management notification message to the server. In this case, the communication unit 110 may transmit the management notification message to the server through the RSUs.

The sensing unit 120 is a component that receives the position of the PM vehicle. The sensing unit 120 may receive the position of the PM vehicle using a module such as a Global Navigation Satellite System (GNSS), Differential Global Positioning System (DGPS), or Carrier-phase DGPS (CDGPS) signal. Receiving the position of the sensing unit 120 is distinguished from estimating the position of the PM vehicle using RSUs by the communication unit 110.

The communication unit 110 may receive or estimate the position of the PM vehicle through communication with the ITS, and the sensing unit 120 may also receive the position of the PM vehicle through a GNSS, DGPS, or CDGPS signal. Also, the communication unit 110 may estimate the position of the PM vehicle through the short range wireless network communication. A received signal strength indicator (RSSI), a time of flight (ToF), a time difference of arrival (TDoA), and the like may be used for the position estimation.

The storage unit 130 is a component that stores PM vehicle-related information and user-related information. The PM vehicle-related information may include identification information, a location, a position change, a battery charge amount, a communication state, reception sensitivity, or the like of a PM vehicle. The user-related information may include an identification number of a user, a PM vehicle rental history, a PM vehicle neglect history, an accident history, an age, a gender, and the like. Also, the storage unit 130 may store a last rental/return time of the PM vehicle.

The timer 140 is a component that measures and records time. The timer 140 is used to measure the position change of the PM vehicle.

The control unit 150 is a component that determines whether to manage the PM vehicle based on at least one of the position, the position change, and the battery charge amount of the PM vehicle and transmits the management notification message to the server. Specifically, when it is determined that the PM vehicle is the management target, the control unit 150 transmits, to the server, the management notification message including at least one of the identification information, the position, the position change, and the battery charge amount of the PM vehicle and whether or not the PM vehicle is the management target.

The server manages a PM vehicle to be managed according to the management notification message. For example, the server may allocate a collection person to collect the PM vehicle to be managed. Also, when the battery charge amount is sufficient, the server instructs the PM vehicle to be managed to autonomously drive so that the PM vehicle to be managed may move to a designated location. When an alarm is embedded in the PM vehicle, the server may transmit a command signal to the PM vehicle to sound a warning sound. In addition, the server may manage the PM vehicle in such a way that a user around the PM vehicle moves the PM vehicle to the designated location and may provide incentives.

According to an embodiment of the present disclosure, when the position of the PM vehicle is within the management area, the control unit 150 determines that the PM vehicle is the management target.

Here, the management area may be set based on at least one of a type of management area, the number of PM vehicles to be managed, a use request frequency, and a management request frequency from a user. In an embodiment, an area where management necessity is high, the number of PM vehicles to be managed is high, and the use request frequency of the PM vehicle by the user is low may be set as the management area. In addition, when users request to the server to manage an area where the PM vehicle needs to be managed, the server may set the corresponding area as the management area according to the management request frequency of the user.

The type of the management area may include at least one of a vehicle area, a pedestrian area, a vehicle congestion area, a pedestrian congestion area, an inaccessible area, and a parking and parking congestion area.

The control unit 150 may set the management necessity for the type of management area. For example, the control unit 150 may set the management necessity in the order of the vehicle congestion area, the vehicle area, the pedestrian congestion area, the pedestrian area, the parking and parking congestion area, and the inaccessible area to be low. The control unit 150 may set the management necessity for the vehicle area to be low and set the management necessity for the inaccessible area to be high. This is because the PM vehicle is less likely to be left in the vehicle area where vehicles travel, and the PM vehicle is more likely to be left in the inaccessible area.

According to an embodiment of the present disclosure, when the position of the PM vehicle is within the management area and the position of the PM vehicle does not deviate from a predetermined range for a certain period of time, the control unit 150 may determine that the PM vehicle is the management target. This is to determine that the PM vehicle is not the management target when users use the PM vehicle or the PM vehicle is forcibly moved even when the PM vehicle is located in the management area. According to another embodiment of the present disclosure, even when the PM vehicle is not located in the management area, when the position change of the PM vehicle is within a predetermined range for a certain period of time, the control unit 150 may determine that the PM vehicle is the management target.

The predetermined range may mean a position error range of the PM vehicle measured by the sensing unit 120 or a position error range of the PM vehicle estimated by the communication unit 110. Otherwise, the predetermined range may be a range arbitrarily set by an administrator.

Specifically, the control unit 150 periodically confirms the position of the PM vehicle and measures the position change of the PM vehicle over time. For example, when the PM vehicle has not deviated from a range of 100 m for one week, the control unit 150 may determine that the PM vehicle is the management target. When the PM vehicle has not deviated from a range of 50 m for one day, the control unit 150 may determine that the PM vehicle is the management target.

According to an embodiment of the present disclosure, when the battery charge amount is lower than a preset value, the control unit 150 may enter a power saving mode.

The power saving mode means a mode in which power is supplied to the communication unit 110, and the management notification message including the position and battery charge amount of the PM vehicle is periodically transmitted to the server. The power saving mode is to prevent a situation in which it is impossible to determine whether the PM vehicle is the management target because the battery unit 100 is discharged.

According to an embodiment of the present disclosure, when the battery charge amount is greater than a preset value and the position of the PM vehicle cannot be estimated, the control unit 150 may determine that the PM vehicle is the management target. This is to prevent a situation in which the PM vehicle is located inside or in the basement of a building, and therefore, it may not be determined whether the PM vehicle is the management target according to the position of the PM vehicle even when the charge amount of the battery unit 100 is sufficient.

The situation in which the position cannot be estimated means that the communication unit 110 or the sensing unit 120 cannot estimate the position of the PM vehicle or the amount of the position change is excessively high. In addition, a case where the position of the PM vehicle is not updated from the last estimated position for a certain period of time is also included.

Figure 2:
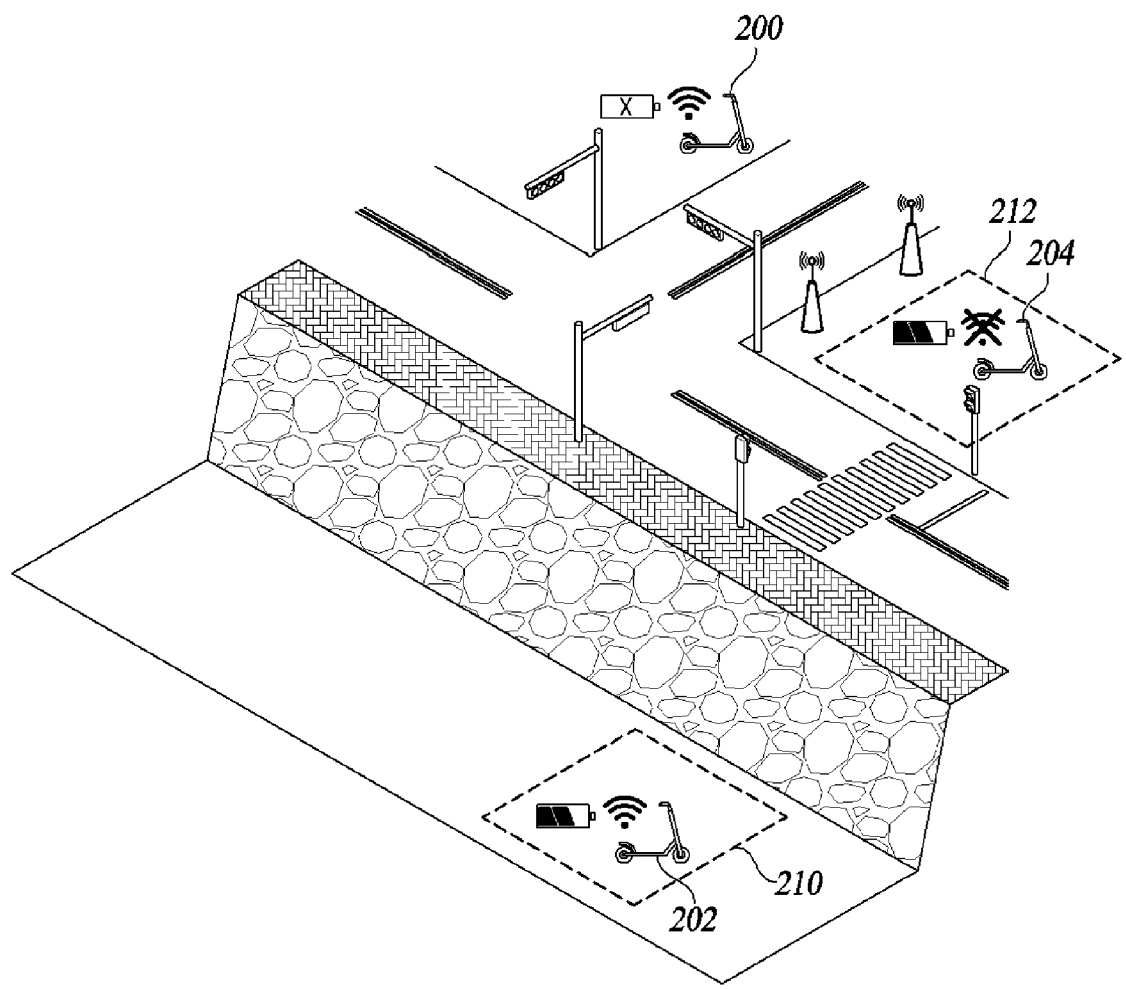
FIG. 2 is an exemplary diagram for describing a method of managing a shared PM vehicle according to an embodiment of the present disclosure.

FIG. 2 is an exemplary diagram for describing a method of managing a shared PM vehicle according to an embodiment of the present disclosure.

Referring to FIG. 2, a first PM vehicle 200, a second PM vehicle 202, a third PM vehicle 204, a first management area 210, and a second management area 212 are illustrated. The first management area 210 is an inaccessible area that a user cannot access.

The first PM vehicle 200 is in a state in which the battery charge amount is insufficient but the position can be estimated. Specifically, the first PM vehicle 200 enters a power saving mode because the battery charge amount is lower than a preset value. The first PM vehicle 200 uses minimal power to estimate the position and transmit a management notification message to the server. This is to prevent a situation in which the PM vehicle cannot be managed due to discharge.

The second PM vehicle 202 is in a state in which the battery charge amount is sufficient and the position can be estimated, but the second PM vehicle 202 is located in the first management area 210. Specifically, the second PM vehicle 202 may be in a state in which the battery charge amount is greater than the preset value and the position can be estimated. However, the second PM vehicle 202 is located in the first management area 210 and, therefore, it can be determined that the second PM vehicle 202 is a management target. Alternatively, it can be determined that the second PM vehicle 202 is the management target when the position change within the first management area 210 for a predetermined period of time is within a predetermined range.

The third PM vehicle 204 is in a state in which the battery charge amount is sufficient but the position cannot be estimated, and the third PM vehicle 204 is located in the second management area 212. Specifically, it can be determined that the third PM vehicle 204 is the management target because the battery charge amount is greater than the preset value, but the position cannot be estimated. For example, when the third PM vehicle 204 cannot estimate the position of the PM vehicle due to difficult communication with RSUs, failure to receive a GPS signal, a sudden change in the estimated position, or the like, it can be determined that the third PM vehicle 204 is the management target. That is, it is also possible to determine whether to manage the PM vehicle in consideration of only the position change of the PM vehicle.

Figure 3:
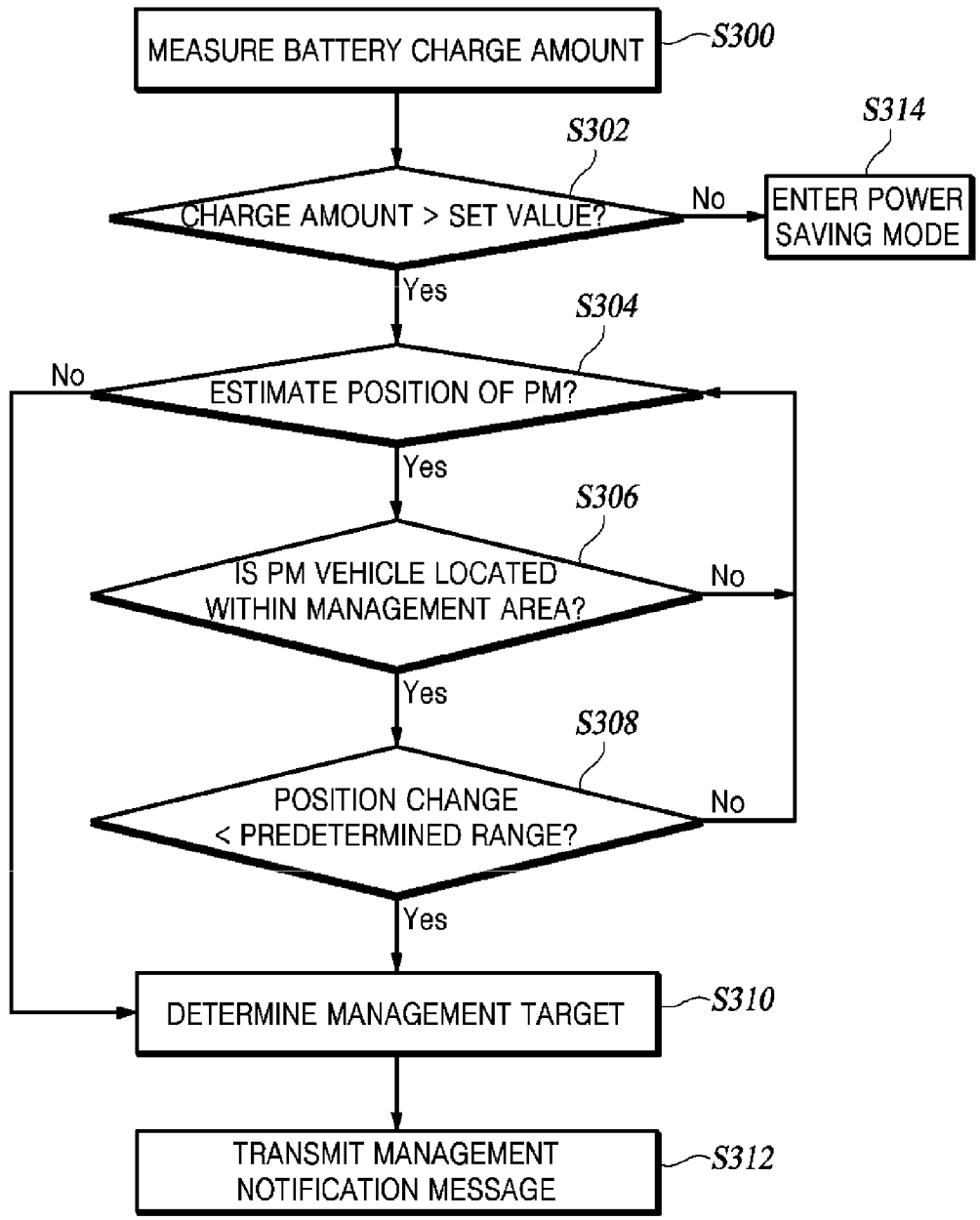
FIG. 3 is a flowchart for describing the method of managing a shared PM vehicle according to the embodiment of the present disclosure.

FIG. 3 is a flowchart for describing the method of managing a shared PM vehicle according to the embodiment of the present disclosure.

Referring to FIG. 3, the apparatus for managing a shared PM vehicle (hereinafter, "management apparatus") periodically measures the battery charge amount at S300. The management apparatus may measures the battery charge amount using a device mounted on the shared PM vehicle. Specifically, the device measure the battery charge amount of the shared PM vehicle. The management apparatus may receive information on the battery charge amount from the device.

The management apparatus compares the battery charge amount with the preset value at S302. Specifically, the management apparatus determines whether the battery charge amount is greater than or lower than the preset value.

When the battery charge amount is lower than the preset value, the management apparatus enters the power saving mode at S314. The power saving mode is a mode in which power is supplied to the communication unit 110, and the management notification message including the position and battery charge amount of the PM vehicle is periodically transmitted to the server. To this end, in the power saving mode, the management apparatus periodically estimates the position of the PM vehicle and measures the battery charge amount.

When the battery charge amount is greater than the preset value, the management apparatus determines whether the position of the PM vehicle, that is, the position of the management apparatus can be estimated at S304.

When the management apparatus cannot estimate the position of the PM vehicle, the management apparatus determines that the PM vehicle is the management target at S310. That is, when the battery charge amount is greater than the preset value but the position of the PM vehicle cannot be estimated, the management apparatus determines that the PM vehicle is the management target.

When the management apparatus can estimate the position of the PM vehicle, the PM vehicle apparatus determines whether the PM vehicle is located within the management area at S306. Here, the management area may be set based on at least one of a type of the management area, the number of PM vehicles to be managed, and the use request frequency.

When the PM vehicle is located within the management area, the management apparatus compares the position change of the PM vehicle with the predetermined range at S308. On the other hand, when the PM vehicle is not located within the management area, the management apparatus may estimate the position of the PM vehicle again.

According to another embodiment of the present disclosure, even when the PM vehicle is not located in the management area, when the position change of the PM vehicle is within the predetermined range for a certain period of time, the management apparatus may determine that the PM vehicle is the management target.

When the position change of the PM vehicle is smaller than the predetermined range, the management apparatus determines that the PM vehicle is the management target at S310. On the other hand, when the position change of the PM vehicle is greater than the predetermined range, the management apparatus may estimate the position of the PM vehicle again.

The management apparatus includes information on the PM vehicle determined as the management target in the management notification message and transmits the management notification message to the server at S312.

Figure 4A:
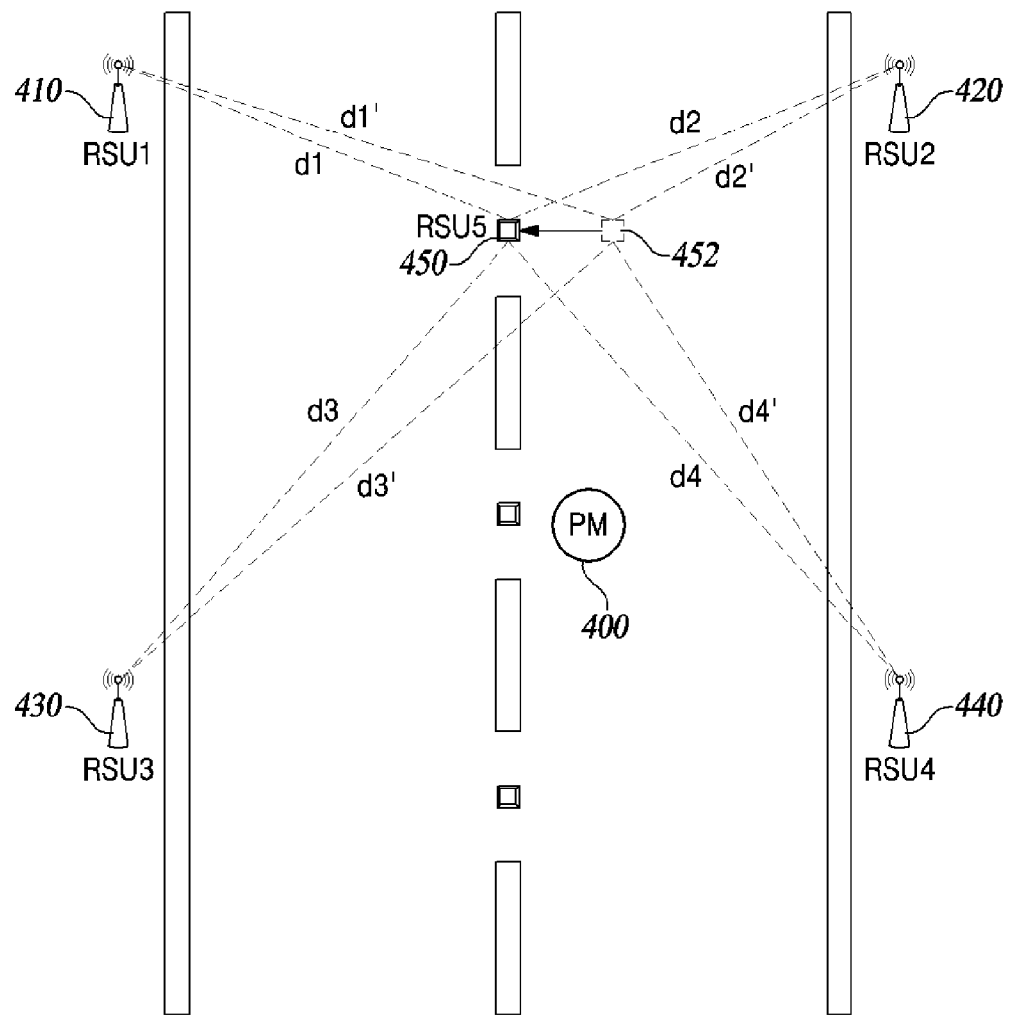
FIGS. 4A and 4B are exemplary diagrams for explaining a process of estimating an accurate position of a PM vehicle according to an embodiment of the present disclosure.
Figure 4B:
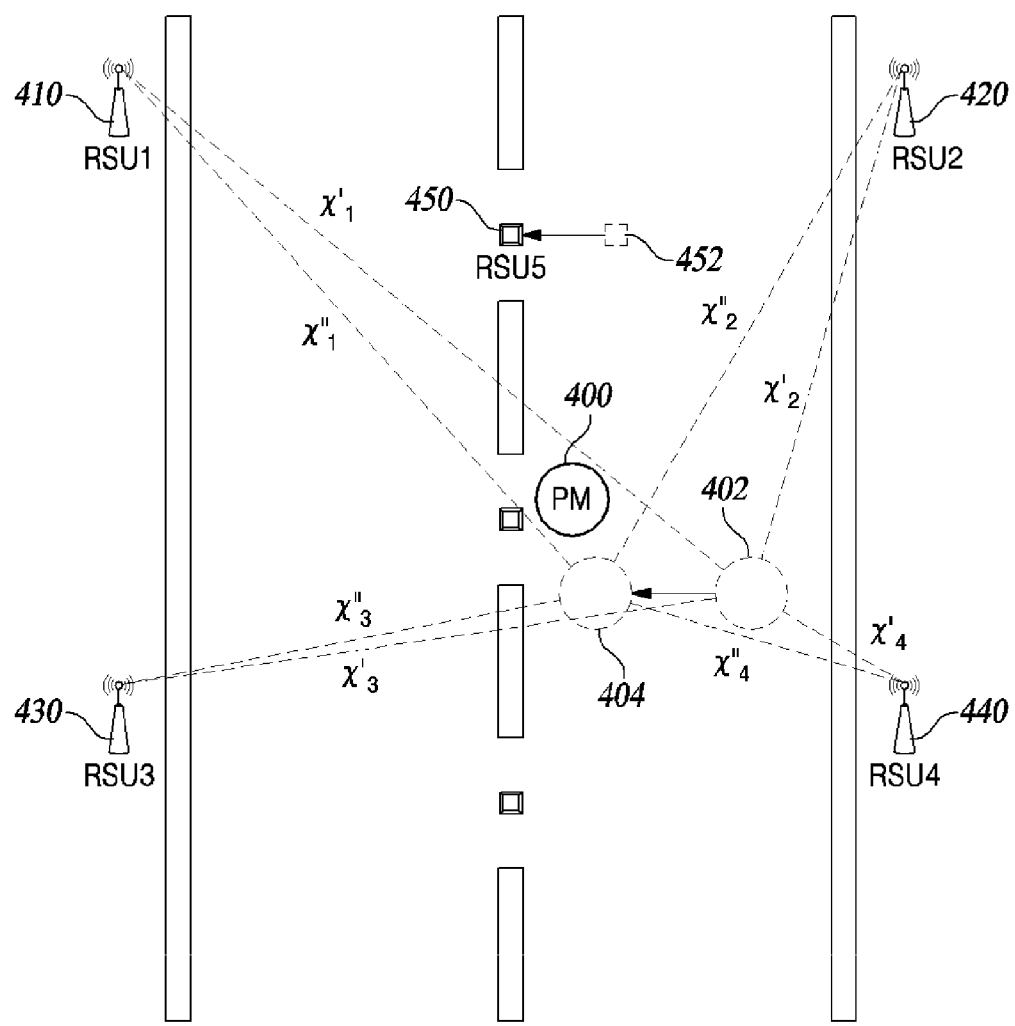

FIGS. 4A and 4B are exemplary diagrams for describing a process of estimating an accurate position of a PM vehicle according to an embodiment of the present disclosure.

In detail, FIG. 4A is a diagram for describing a process of generating correction data. FIG. 4B is a diagram for describing a process of correcting the candidate position of the PM vehicle based on the correction data.

Referring to FIG. 4A, an actual position 400 of a PM vehicle, a plurality of RSUs 410, 420, 430, 440, and 450, and an estimated position 452 of a fifth RSU are illustrated. The plurality of RSUs are referred to the auxiliary RSUs 410, 420, 430, and 440 and the fifth RSU 450. The auxiliary RSUs are referred to the first RSU 410, the second RSU 420, the third RSU 430, and the fourth RSU 440. FIG. 4B additionally illustrates an estimated position 402 of the PM vehicle and a corrected position 404 of the PM vehicle.

Hereinafter, the fifth RSU 450 is described as a reference RSU for correction of the estimated position, but this is only one embodiment, and the reference RSU may be implemented by at least one of the first RSU 410, the second RSU 420, the third RSU 430, or the fourth RSU 440. Meanwhile, the auxiliary RSUs 410, 420, 430, and 440 are only an embodiment and may be constituted as at least three of the auxiliary RSUs. Position coordinates for the plurality of RSUs 410, 420, 430, 440, and 450 are assumed to be known in advance.

Hereinafter, it will be described that the management apparatus generates correction data. However, the correction data can be generated by another device or the reference RSU. At this time, the reference RSU may be set to store and transmit the correction data.

The fifth RSU 450 receives messages from the auxiliary RSUs 410, 420, 430, and 440. The management apparatus calculates the distances between the fifth RSU 450 and the auxiliary RSUs 410, 420, 430, 440 based on at least one of the RSSI and the ToF of the messages received by the fifth RSU 450, and the positions of the auxiliary RSUs 410, 420, 430, and 440. At this time, the known positions of the auxiliary RSUs 410, 420, 430, and 440 are utilized.

Based on the distances between the fifth RSU 450 and the auxiliary RSUs 410, 420, 430, and 440, the management apparatus may derive the estimated position 452 of the fifth RSU.

However, the actual position and the estimated position 452 of the fifth RSU may not be matched due to a signal distortion due to weather or obstacles, errors in the RSU, and the like. By obtaining, however, an error between the known actual position and the estimated position 452 of the fifth RSU and using the previously obtained error as the positioning correction data of the PM vehicle, the management apparatus can accurately derive the actual position 400 of the PM vehicle.

In particular, the management apparatus may accurately derive the actual position 400 of the PM vehicle using correction data including any one of a distance error ratio, a distance error, and a position error of the fifth RSU 450.

Hereinafter, a process of generating correction data in the order of a distance error ratio, a distance error, and a position error, and correcting the position of the PM vehicle using the correction data will be described.

As a first embodiment, in order to use the distance error ratio, the management apparatus calculates a distance $d_1'$ between the estimated position 452 of the fifth RSU and the position of the first RSU 410 based on at least one of the RSSI or the ToF of the messages received by the fifth RSU 450. The management apparatus further calculates a distance $d_1$ between the actual position of the fifth RSU 450 and the position of the first RSU 410.

The management apparatus calculates an error ratio (hereinafter, a first distance error ratio) between $d_1$ and $d_1'$. Here, the distance error ratio means the ratio of the actual distance to the estimated distance. That is, the distance error ratios are the actual distances over the estimated distances. For example, the first distance error ratio means a ratio of $d_1$ to $d_1'$. Additionally, the management apparatus calculates each of a second distance error ratio, a third distance error ratio, and a fourth distance error ratio for the second RSU 420, the third RSU 430, and the fourth RSU 440, respectively.

Referring to FIG. 4B, the management apparatus may derive the corrected position 404 of the PM vehicle by correcting the estimated position 402 of the PM vehicle using the distance error ratio.

Specifically, the PM vehicle receives messages from the auxiliary RSUs 410, 420, 430, and 440. The management apparatus may estimate the estimated position 402 of the PM vehicle based on at least one of the RSSI and the ToF of the messages received by the PM vehicle. In detail, the management apparatus calculates the estimated position 402 of the PM vehicle through the triangulation or the trilateration based on at least three positions of the auxiliary RSUs 410, 420, 430, and 440, and the RSSI or the ToF of the messages received from three RSUs.

The management apparatus obtains the distances between the estimated position 402 of the PM vehicle and the positions of the auxiliary RSUs 410, 420, 430, and 440. The distances from the estimated position 402 of the PM vehicle to the positions of the auxiliary RSUs 410, 420, 430, and 440 are x1', x2', x3', and x4', respectively.

Thereafter, the management apparatus may calculate the distance error ratios that are the correction data. The distance error ratios mean distance error ratios from the fifth RSU 450 to the auxiliary RSUs 410, 420, 430, and 440.

The management apparatus may obtain the corrected distances by multiplying the distance error ratio by the distances between the estimated position 402 of the PM vehicle and the positions of the auxiliary RSUs 410, 420, 430, and 440. For example, the management apparatus may obtain x1" by multiplying ($d_1/d_1'$) by x1'. Additionally, the management apparatus may further obtain x2", x3", and x4".

The corrected distances from the estimated position 402 of the PM vehicle to the positions of the auxiliary RSUs 410, 420, 430, and 440 may be expressed as in Equation 1.

$$x'' = x' \times \frac{d}{d'} \qquad \text{Equation 1}$$

In Equation 1, x" denotes the corrected distance from the estimated position 402 of the PM vehicle to the positions of the auxiliary RSUs 410, 420, 430, and 440. x' denotes the distance from the estimated position 402 of the PM vehicle to the positions of the auxiliary RSUs 410, 420, 430, and 440. d denotes the distance from the actual position of the fifth RSU 450 to the auxiliary RSUs 410, 420, 430, and 440.

d' denotes the distance from the estimated position 452 of the fifth RSU to the positions of the auxiliary RSUs 410, 420, 430, and 440.

The management apparatus may calculate the corrected position 404 of the PM vehicle through the triangulation or the trilateration based on at least three of x1", x2", x3", and x4". Since the error between the actual distance and the estimated distance from the fifth RSU 450 to the auxiliary RSUs 410, 420, 430, and 440 is reflected in the estimated position 402 of the PM vehicle, the corrected position 404 of the PM vehicle is derived to be closer to the actual position 400 of the PM vehicle than the estimated position 402 of the PM vehicle.

The management apparatus according to the embodiment of the present disclosure may correct the estimated position 402 of the PM vehicle using the error ratio for one of the RSSI or the ToF instead of the distance.

As a second embodiment, the management apparatus may calculate the distance errors as the correction data. The distance errors mean distance errors between the fifth RSU 450 and the auxiliary RSUs 410, 420, 430, and 440.

In order to use the distance error, the management apparatus calculates an error (hereinafter, a first distance error) between $d_1$ and $d_1'$. Specifically, the first distance error means a value obtained by subtracting $d_1'$ from $d_1$. Additionally, the management apparatus calculates each of the second distance error, the third distance error, and the fourth distance error for the second RSU 420, the third RSU 430, and the fourth RSU 440.

Referring to FIG. 4B, the management apparatus may derive the corrected position 404 of the PM vehicle by correcting the estimated position 402 of the PM vehicle using the distance error.

Specifically, the PM vehicle receives messages from the auxiliary RSUs 410, 420, 430, and 440. The management apparatus may estimate the estimated position 402 of the PM vehicle based on at least one of the RSSI and the ToF of the messages by the PM vehicle. In detail, the management apparatus calculates the estimated position 402 of the PM vehicle through the triangulation or trilateration based on at least three positions of the auxiliary RSUs 410, 420, 430, and 440, and the RSSI or the ToF of the messages received from three RSUs. In this case, the distances between the estimated position 402 of the PM vehicle and the positions of the auxiliary RSUs 410, 420, 430, and 440 are x1', x2', x3', and x4', respectively.

The management apparatus may obtain the respective corrected distances by adding the distance error to the distances from the estimated position 402 of the PM vehicle to the positions of the auxiliary RSUs 410, 420, 430, and 440. For example, the management apparatus may obtain x1" by adding $(d_1-d_1')$ to x1'. Additionally, the management apparatus may further obtain x2", x3", and x4".

The distances from the estimated position 402 of the PM vehicle to the positions of the auxiliary RSUs 410, 420, 430, and 440 may be expressed as in Equation 2.

$$x''=x'+(d-d') \qquad \text{Equation 2}$$

The management apparatus may calculate the corrected position 404 of the PM vehicle through the triangulation or trilateration based on at least three of x1", x2", x3", and x4". Since the error between the actual distance and the estimated distance from the fifth RSU 450 to the auxiliary RSUs 410, 420, 430, and 440 is reflected in the estimated position 402 of the PM vehicle, the corrected position 404 of the PM vehicle may be closer to the actual position 400 of the PM vehicle than the estimated position 402 of the PM vehicle.

The management apparatus according to the embodiment of the present disclosure may correct the estimated position 402 of the PM vehicle using the error ratio for one of the RSSI or the ToF instead of the distance.

As a third embodiment, the management apparatus may calculate the position errors as the correction data. The position error means a difference between the estimated position 452 and the actual position of the fifth RSU 450. Otherwise, the management apparatus calculates a position error meaning the difference between the actual position of the fifth RSU 450 and the estimated position 452 of the fifth RSU. Here, the position may mean two-dimensional position coordinates or three-dimensional position coordinates. The position error is calculated by calculations for each dimension.

After estimating the estimated position 402 of the PM vehicle, the management apparatus may derive the corrected position 404 of the PM vehicle by correcting the estimated position 402 of the PM vehicle based on the position error for the fifth RSU 450. Specifically, each of the corrections may be performed by dividing the estimated position 402 of the PM vehicle into an x coordinate and a y coordinate.

Meanwhile, the management apparatus may receive the distance error ratio, the distance error, and the position error between the fifth RSU 450 and the auxiliary RSUs 410, 420, 430, and 440 in real time or may calculate and store, in advance, the distance error ratio, the distance error, and the position error.

Through the above-described three error corrections, the management apparatus may derive the accurate position of the PM vehicle.

Although it is described in FIG. 3 that operations S300 to S314 are sequentially executed, this is merely illustrative of the technical idea of an embodiment of the present disclosure. In other words, those of ordinary skill in the technical field to which an embodiment of the present disclosure belongs may change the order described in FIG. 3 within a range that does not deviate from the essential characteristics of an embodiment of the present disclosure, or will be able to apply various modifications and variations to executing one or more of the operations S300 to S314 in parallel, and therefore, FIG. 3 is not limited to a time-series order.

Meanwhile, the operations illustrated in FIG. 3 can be implemented as computer-readable codes on a computer-readable recording medium. The computer readable recording medium may include all kinds of recording apparatuses in which data that may be read by a computer system is stored. That is, the computer-readable recording medium may be a non-transitory medium such as a read-only memory (ROM), a random-access memory (RAM), a compact disc (CD)-ROM, a magnetic tape, a floppy disk, and an optical data storage device and may further include a transitory medium such as a carrier wave (for example, transmission over the Internet) and a data transmission medium. In addition, the computer readable recording media may be distributed in computer systems connected to each other through a network such that the computer readable codes may be stored and executed in the computer readable recording media in a distributed scheme.

In addition, components of the present disclosure may use an integrated circuit structure such as a memory, a processor, a logic circuit, a look-up table, and the like. These integrated circuit structures execute each of the functions described herein through the control of one or more microprocessors or other control devices. In addition, components of the present disclosure may be specifically implemented by a program or a portion of a code that includes one or more executable instructions for performing a specific logical function and is executed by one or more microprocessors or other control devices. In addition, components of the present disclosure may include or be implemented as a Central Processing Unit (CPU), a microprocessor, etc. that perform respective functions. In addition, components of the present disclosure may store instructions executed by one or more processors in one or more memories.

As described above, according to an embodiment of the present disclosure, it is possible to improve accessibility and convenience for users by finding and managing PM vehicles that are positioned at locations that are difficult for users to access or that are not used for a long period of time in a PM vehicle sharing service.

According to another embodiment of the present disclosure, it is possible to manage PM vehicles before the PM vehicles are completely discharged by transmitting management notification to a server and taking into account a battery charge amount when the PM vehicles are in an inaccessible area or left in a PM vehicle sharing service.

According to another embodiment of the present disclosure, it is possible to accurately estimate positions of PM vehicles by communication with an ITS in estimating the positions of the PM vehicles.

Although exemplary embodiments of the present disclosure have been described for illustrative purposes, those skilled in the art will appreciate that various modifications, additions, and substitutions are possible, without departing from the idea and scope of the claimed disclosure. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

The invention claimed is:

1. An apparatus for managing a shared personal mobility (PM) vehicle, comprising:
   a battery unit configured to supply power;
   a communication unit configured to communicate with a server and road side units; and
   a control unit configured to determine whether to manage a PM vehicle based on at least one of a position, a position change, and a battery charge amount of the PM vehicle, and to transmit a management notification message to the server;
   wherein, when the battery charge amount is greater than a preset value and the position of the PM vehicle is not estimated, the control unit is further configured to determine that the PM vehicle is a management target.

2. The apparatus of claim 1, wherein, when the position of the PM vehicle is within a management area, the control unit is configured to determine that the PM vehicle is a management target.

3. The apparatus of claim 2, wherein the management area is set based on at least one of a type of the management area, the number of PM vehicles to be managed, a use request frequency, and a management request frequency from a user.

4. The apparatus of claim 1, wherein, when the position of the PM vehicle is within a management area, and the position of the PM vehicle does not deviate from a predetermined range for a preset period, the control unit is configured to determine that the PM vehicle is a management target.

5. The apparatus of claim 1, wherein the control unit is configured to enter a power saving mode when the battery charge amount is lower than a preset value.

6. The apparatus of claim 5, wherein, in the power saving mode, the power is supplied to the communication unit, and the management notification message including the position of the PM vehicle and the battery charge amount is periodically transmitted to the server.

7. A method of managing a shared personal mobility (PM) vehicle implemented by a computer, the method comprising:
   measuring a battery charge amount of a PM vehicle;
   estimating a position of the PM vehicle;
   determining whether to manage the PM vehicle based on at least one of the position, a position change, and the battery charge amount of the PM vehicle; and
   transmitting a management notification message to a server;
   wherein determining whether to manage the PM vehicle comprises:
     when the battery charge amount is greater than a preset value and the position of the PM vehicle is not estimated, determining that the PM vehicle is a management target.

8. The method of claim 7, wherein determining whether to manage the PM vehicle comprises:
   when the position of the PM vehicle is within a management area, determining that the PM vehicle is a management target.

9. The method of claim 8, wherein the management area is set based on at least one of a type of the management area, the number of PM vehicles to be managed, a use request frequency, and a management request frequency from a user.

10. The method of claim 7, wherein determining whether to manage the PM vehicle comprises:
    when the position of the PM vehicle is within a management area and the position of the PM vehicle does not deviate from a predetermined range for a preset period, determining that the PM vehicle is a management target.

11. The method of claim 7, further comprising:
    entering a power saving mode when the battery charge amount is lower than a preset value.

12. The method of claim 11, wherein, in the power saving mode, power is supplied to a communication unit, and the management notification message including the position of the PM vehicle and the battery charge amount is periodically transmitted to the server.

* * * * *